US012038150B2

(12) United States Patent
Chen

(10) Patent No.: US 12,038,150 B2
(45) Date of Patent: Jul. 16, 2024

(54) LIGHTING DEVICES WITH UPLIGHTING WITH ADJUSTABLE OPTICS

(71) Applicant: SIGNIFY HOLDING B.V., Eindhoven (NL)

(72) Inventor: Ling Chen, Peachtree, GA (US)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/032,300

(22) PCT Filed: Oct. 20, 2021

(86) PCT No.: PCT/EP2021/079051

§ 371 (c)(1),
(2) Date: Apr. 17, 2023

(87) PCT Pub. No.: WO2022/084375

PCT Pub. Date: Apr. 28, 2022

(65) Prior Publication Data

US 2023/0400162 A1 Dec. 14, 2023

Related U.S. Application Data

(60) Provisional application No. 63/105,155, filed on Oct. 23, 2020.

(30) Foreign Application Priority Data

Oct. 29, 2020 (EP) .................................... 20204554

(51) Int. Cl.
*F21V 3/02* (2006.01)
*F21S 8/02* (2006.01)
*F21V 7/00* (2006.01)

(52) U.S. Cl.
CPC ................ *F21S 8/026* (2013.01); *F21V 3/02* (2013.01); *F21V 7/0025* (2013.01)

(58) Field of Classification Search
CPC ........... F21S 8/026; F21V 3/02; F21V 7/0025
See application file for complete search history.

(56) References Cited

U.S. PATENT DOCUMENTS

2005/0180132 A1* 8/2005 Chung .................... F21V 11/14 362/292
2006/0198136 A1 9/2006 Kassay et al.
(Continued)

FOREIGN PATENT DOCUMENTS

CN 209399206 U 9/2019
DE 10300885 A1 7/2004
(Continued)

OTHER PUBLICATIONS

English translation of Masami JP-S6072107-A, published Apr. 1985 (Year: 1985).*

*Primary Examiner* — Evan P Dzierzynski

(57) ABSTRACT

A lighting device (100) can include multiple light sources (170) that emit light along a range of radiation paths (195). The lighting device (100) can also include a reflective component (130-1) disposed proximate to at least a portion of a first side interior surface in a first portion (195-2) of the range of radiation paths (195), where the light in the first portion (195-2) of the range of radiation paths (195) reflects off of the reflective component (130-1). The lighting device (100) can further include a housing (105) having an optical feature (120) adjacent to the reflective component (130-1), where the light in the first portion (195-2) of the range of radiation paths (195), after reflecting off of the reflective component (130-1), passes through the optical feature (120) into a first part (140-2) of an ambient environment (140). The reflective component (1301) can be adjacent to an (Continued)

opening through which a second portion (195-1) of the range of radiation paths (195) passes into a second part (140-1) of the ambient environment (140).

15 Claims, 13 Drawing Sheets

(56) References Cited

U.S. PATENT DOCUMENTS

| | | | | |
|---|---|---|---|---|
| 2012/0217897 | A1 | 8/2012 | Gordin et al. | |
| 2013/0021777 | A1* | 1/2013 | Pickard | F21V 7/0016 362/382 |
| 2013/0021792 | A1 | 1/2013 | Snell et al. | |
| 2013/0135876 | A1 | 5/2013 | Phillips, III | |
| 2014/0071679 | A1* | 3/2014 | Booth | F21S 8/026 362/249.02 |
| 2017/0159907 | A1 | 6/2017 | Dyson et al. | |
| 2018/0119908 | A1* | 5/2018 | Chien | G03B 23/00 |
| 2019/0120449 | A1* | 4/2019 | Jones | F21V 21/041 |
| 2020/0056763 | A1* | 2/2020 | Wilson | F21S 8/03 |
| 2020/0332970 | A1* | 10/2020 | Agro | H05B 47/105 |

FOREIGN PATENT DOCUMENTS

| | | | | |
|---|---|---|---|---|
| EP | 2896876 | A1 | | 7/2015 |
| EP | 3270047 | B1 | | 2/2020 |
| JP | S6072107 | A | * | 4/1985 |
| JP | S6072107 | A | | 4/1985 |
| WO | 2020156876 | A1 | | 8/2020 |

* cited by examiner

LIGHTING DEVICES WITH UPLIGHTING WITH ADJUSTABLE OPTICS

CROSS-REFERENCE TO PRIOR APPLICATIONS

This application is the U.S. National Phase application under 35 U.S.C. § 371 of International Application No. PCT/EP2021/079051, filed on Oct. 20, 2021, which claims the benefits of European Patent Application No. 20204554.8, filed on Oct. 29, 2020, and U.S. Patent Application No. 63/105,155, filed on Oct. 23, 2020. These applications are hereby incorporated by reference herein.

TECHNICAL FIELD

The present disclosure relates generally to lighting devices, and more particularly to systems, methods, and devices for lighting devices with uplighting with adjustable optics.

BACKGROUND

A number of different types of lighting devices, such as linear light fixtures, use louvers, other optical features, and/or no optical features for downlighting. Such lighting devices are typically suspended from some structure (e.g., a ceiling, an overhang, a beam) by some distance so that there is a physical separation between the structure and the lighting device. As a result of such lighting devices being suspended from a structure, there is an opportunity for providing uplighting as well as downlighting.

SUMMARY

In general, in one aspect, the disclosure relates to a lighting device that includes a housing having multiple walls that form a cavity, where the walls include an optical feature. The lighting device can also include multiple light sources that emit light along a range of radiation paths into the cavity, where the range of radiation paths includes a first portion and a second portion. The lighting device can further include multiple louvers disposed at a first location within the cavity, where the first location is in the first portion of the range of radiation paths, where the light in the first portion of the range of radiation paths passes around the louvers into a first part of an ambient environment. The lighting device can also include a reflective component disposed at a second location within the cavity, where the second location is in a second portion of the range of radiation paths, where the light in the second portion of the range of radiation paths reflects off of the reflective component. The lighting device can also include multiple adjustable optical devices that at least partially encloses multiple light sources, wherein the multiple adjustable optical devices include two or more optics/lens portions coupled to form the multiple adjustable optical devices that provides a predetermined light distribution. The light in the second portion of the range of radiation paths, after reflecting off of the reflective component, can pass through the optical feature into a second part of the ambient environment. The second part of the ambient environment can be elevated relative to the first part of the ambient environment.

In another aspect, the disclosure relates to a lighting device that includes a housing having multiple walls that form a cavity, where walls include an optical feature. The lighting device can also include multiple light sources that emit light along a range of radiation paths into the cavity, where the range of radiation paths of the light include a first portion and a second portion. The lighting device can further include a reflective component disposed at a first location in the cavity within the first portion of the range of radiation paths of the light, where the light in the first portion of the range of radiation paths reflects off of the reflective component toward the optical feature and subsequently passes through the optical feature into a first part of an ambient environment. The light in the second portion of the range of radiation paths can pass through an opening at a second location in the cavity into a second part of the ambient environment. The first part of the ambient environment can be elevated relative to the second part of the ambient environment.

In yet another aspect, the disclosure relates to an uplight assembly for a lighting device, where the uplight assembly can include an optical feature integrated with a housing of the lighting device. The uplight assembly can also include a reflective component disposed at a location within a cavity formed by the housing of the lighting device, where the location is near a side interior surface of the housing. The reflective component can be positioned at an acute angle relative to the optical feature. The reflective component can be configured to be disposed adjacent to an opening at a second location in the cavity of the housing, where a portion of light emitted by light sources of the lighting device pass through the opening into a first part of an ambient environment. The reflective component can be configured to reflect at least some of a remainder of the light emitted by light sources of the lighting device. The optical feature can be configured to allow the at least some of the remainder of the light to pass therethrough into a second part of an ambient environment, where the second part of an ambient environment is elevated relative to the first part of the ambient environment.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Moreover, beam adjustable optics are used to provide a desired optical effect, e.g. wide beam, narrow beam, skewed beam, etc. Additionally, certain dimensions or positions may be exaggerated to help visually convey such principles. In the drawings, reference numerals designate like or corresponding, but not necessarily identical, elements.

DETAILED DESCRIPTION

Figure 1A:
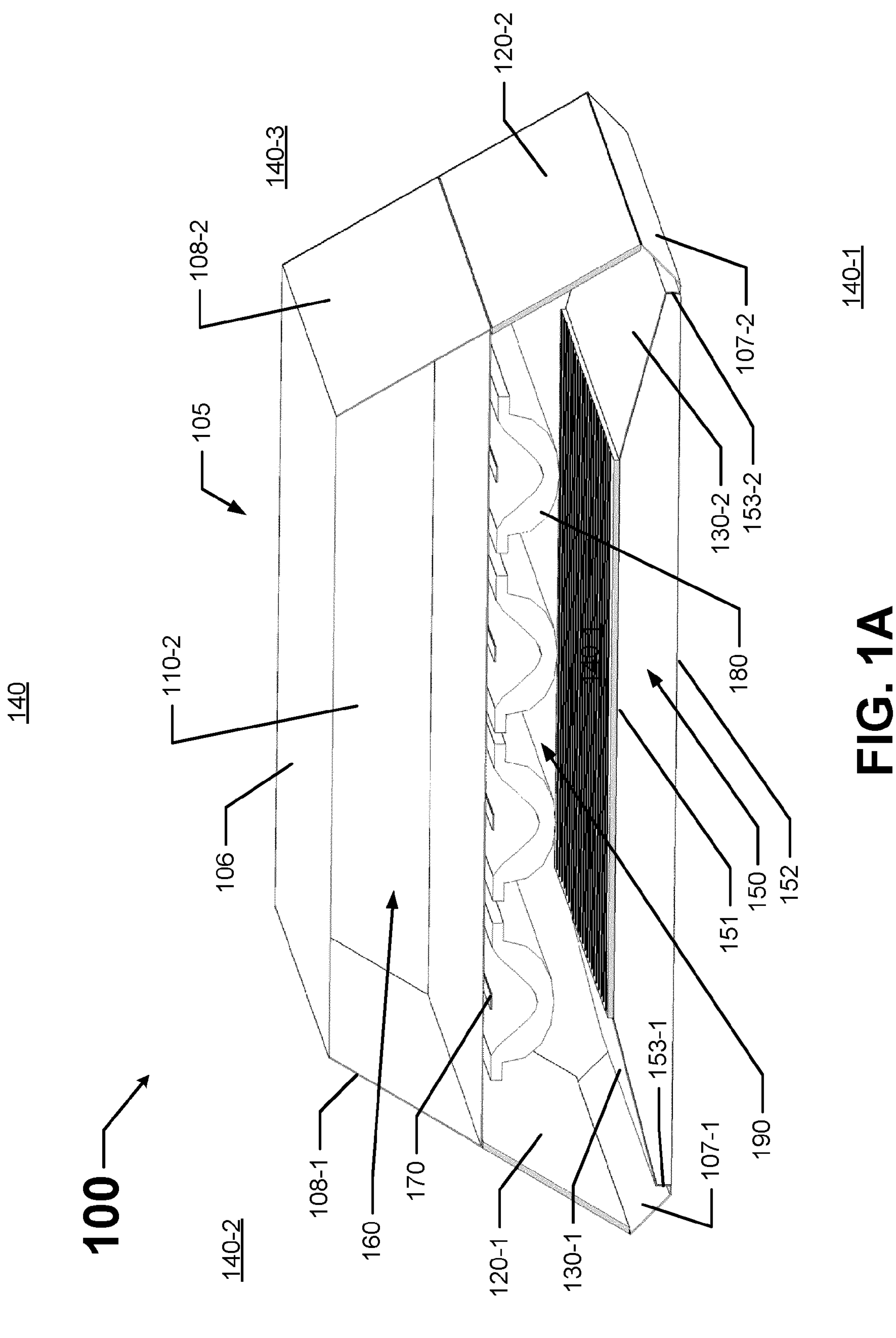
FIGS. 1A through 1C show various views of a lighting device according to certain example embodiments.

In general, example embodiments provide systems, methods, and devices for lighting devices with uplighting. Example embodiments can provide a number of benefits. Such benefits can include, but are not limited to, more efficient and effective light distribution of lighting devices, ease of maintenance, a smaller footprint, and flexible features. Example embodiments can be used with new lighting devices (e.g., luminaires, light fixtures) or retrofit with existing lighting devices. Example lighting devices with uplighting discussed herein can be used with any of a number of different types of lighting devices, including but not limited to linear light fixtures, troffer light fixtures, and circular light fixtures. The lighting devices discussed herein provide general illumination. Lighting devices with uplighting can be located in one or more of any of a number of environments. Examples of such environments can include, but are not limited to, indoors, outdoors, commercial, industrial, education, retail, residential, healthcare applications, an office space, a manufacturing plant, a bathroom, a closet, a kitchen, a breakroom, a warehouse, and a storage facility, both climate-controlled and non-climate-controlled.

Example lighting devices with uplighting (including components thereof) can be made of one or more of a number of suitable materials to allow the lighting device to meet certain standards and/or regulations while also maintaining durability in light of the one or more conditions under which the lighting device and/or other associated components of the lighting device can be exposed. Examples of such materials can include, but are not limited to, aluminum, stainless steel, fiberglass, glass, plastic, ceramic, and rubber. In addition, or in the alternative, one or more components of example lighting devices with uplighting can have a specialized coating (e.g., a reflective coating).

Example lighting devices, or portions thereof, described herein can be made from a single piece (as from a mold, injection mold, die cast, or extrusion process). In addition, or in the alternative, example lighting devices (or portions thereof) can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, snap fittings, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, abutting against, in communication with, or other similar terms. Such terms are merely meant to distinguish various elements and/or features within a component or device and are not meant to limit the capability or function of that particular element and/or feature. For example, a feature described as a “coupling feature” can secure, fasten, abut against, and/or perform other functions aside from physically coupling.

A coupling feature (including a complementary coupling feature) as described herein can allow one or more components and/or portions of an example lighting device to become coupled, directly or indirectly, to some other component of the lighting device. A coupling feature can include, but is not limited to, a clamp, a portion of a hinge, an aperture, a recessed area, a protrusion, a hole, a slot, a tab, a detent, and mating threads. One portion of an example lighting device can be coupled to some other component of the lighting device by the direct use of one or more coupling features.

In addition, or in the alternative, a portion of an example lighting device can be coupled to lighting device some other component of the lighting device using one or more independent devices that interact with one or more coupling features disposed on a component of the lighting device. Examples of such devices can include, but are not limited to, a pin, a hinge, a fastening device (e.g., a bolt, a screw, a rivet), epoxy, glue, adhesive, and a spring. One coupling feature described herein can be the same as, or different than, one or more other coupling features described herein. A complementary coupling feature as described herein can be a coupling feature that mechanically couples, directly or indirectly, with another coupling feature.

In the foregoing figures showing example embodiments of lighting devices with uplighting, one or more of the components shown may be omitted, repeated, and/or substituted. Accordingly, example embodiments of lighting devices with uplighting should not be considered limited to the specific arrangements of components shown in any of the figures. For example, features shown in one or more figures or described with respect to one embodiment can be applied to another embodiment associated with a different figure or description.

In certain example embodiments, lighting devices described herein are subject to meeting certain standards and/or requirements. For example, the National Electric Code (NEC), the National Electrical Manufacturers Association (NEMA), the International Electrotechnical Commission (IEC), the Federal Communication Commission (FCC), the Environmental Protection Agency's (EPA's) Energy Star program, the DesignLights Consortium (DLC), Underwriters Laboratories (UL), and the Institute of Electrical and Electronics Engineers (IEEE) set standards as to electrical enclosures, wiring, and electrical connections. Use of example embodiments described herein meet (and/or allow the lighting device to meet) such standards when applicable.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit number, and corresponding components in other figures have the identical last two digits.

In addition, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of lighting devices with uplighting will be described more fully hereinafter with reference to the accompanying drawings, in which example embodiments of lighting devices with uplighting are shown. Lighting devices with uplighting may, however, be embodied in many different forms and should not be construed as limited to the example embodiments set forth herein. Rather, these example embodiments are provided so that this disclosure will be thorough and complete, and will fully convey the scope of lighting devices with uplighting to those of ordinary skill in the art. Like, but not necessarily the same, elements (also sometimes called components) in the various figures are denoted by like reference numerals for consistency.

Terms such as "first", "second", "above", "below", "inner", "outer", "distal", "proximal", "end", "top", "bottom", "side", "front", "rear", and "within", when present, are used merely to distinguish one component (or part of a component or state of a component) from another. Such terms are not meant to denote a preference or a particular orientation. Such terms are not meant to limit embodiments of lighting devices with uplighting. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1B:
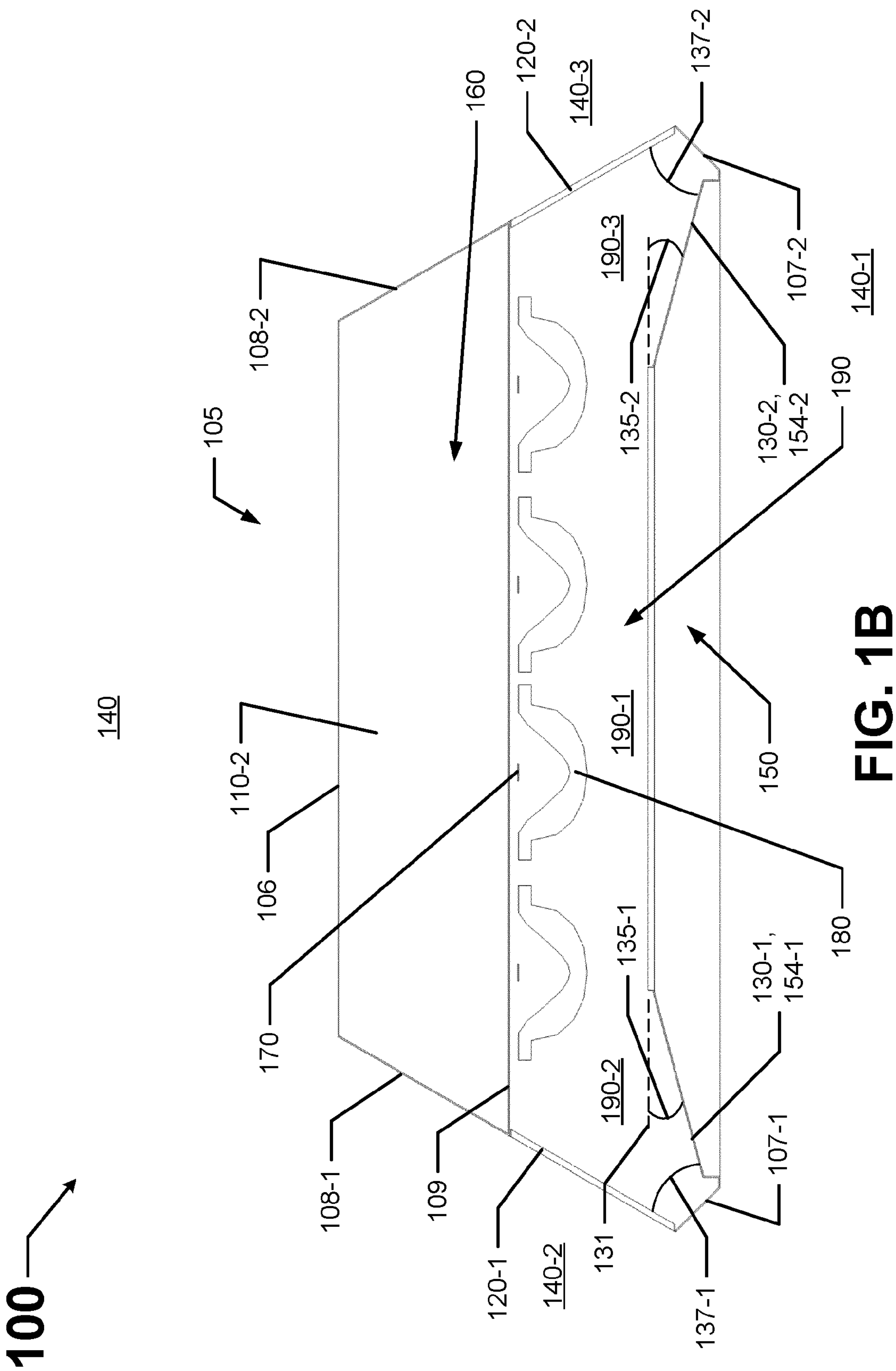
Figure 1C:
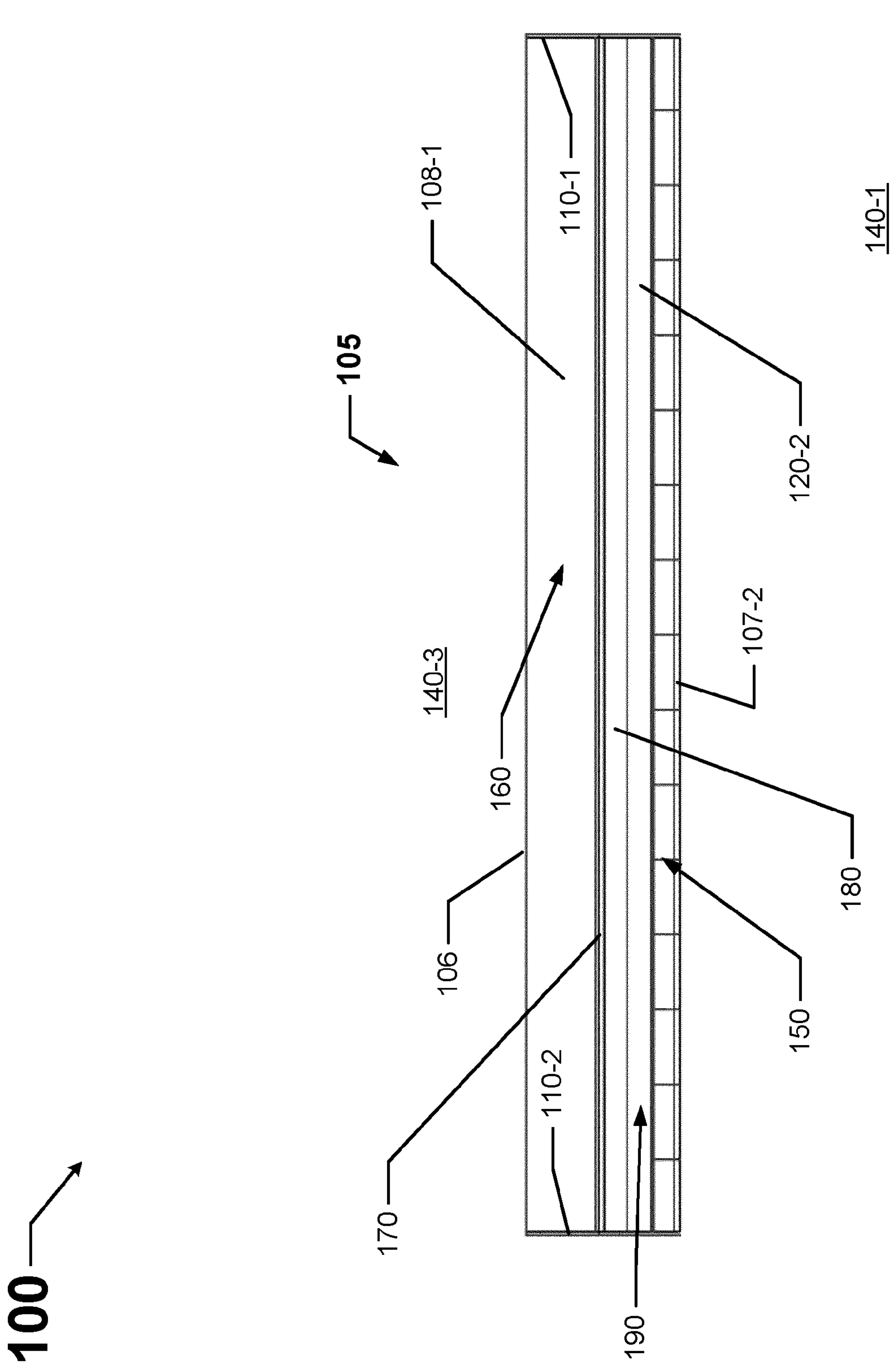

FIGS. 1A through 1C show various views of a lighting device 100 according to certain example embodiments. Specifically, FIG. 1A shows a top-front-side isometric view of the lighting device 100. FIG. 1B shows a front view of the lighting device 100 without one of the endcaps 110 (specifically, endcap 110-1). FIG. 1C shows a cross-sectional side view of the lighting device 100. The lighting device 100 of FIGS. 1A through 1C is in the form of a linear light fixture that includes multiple portions. For example, the lighting device 100 of FIGS. 1A through 1C includes a housing 105 having a top wall 106, two side walls 108 (side wall 108-1 and side wall 108-2), an intermediate wall 109, two end caps 110 (end cap 110-1 and end cap 110-2), and optionally two bottom walls 107 (bottom wall 107-1 and bottom wall 107-2). All of these walls of the housing 105 can be referred to has housing walls herein.

The lighting device 100 is disposed in an ambient environment 140. More particularly, the ambient environment 140 has multiple parts that are adjacent to different components of the lighting device 100. In this case, ambient environment part 140-1 is disposed adjacent to the bottom surfaces 152 of the optional louvers 150, ambient environment part 140-2 is disposed adjacent to the optical feature 120-1, and ambient environment part 140-3 is disposed adjacent to the optical feature 120-2. In this case, the ambient environment part 140-2 and the ambient environment part 140-3 are elevated relative to the ambient environment part 140-1.

In certain example embodiments, the lighting device 100 includes one or more optical features 120 that are integrated with one or more portions of the housing 105. Examples of an optical feature 120 can include, but are not limited to, a diffuser, a prismatic lens, a polycarbonate lens, and an unobstructed opening in one or more walls (e.g., side wall 108) of the housing. In this case, there are two optical features 120. Optical feature 120-1 is integrated with side wall 108-1 of the housing 105 at its distal half (starting at the intermediate wall 109 of the housing 105), and optical feature 120-2 is integrated with side wall 108-2 of the housing 105 at its distal half. In alternative embodiments, the housing 105 can have only one optical feature 120 or three or more optical features 120 integrated therewith.

In this case, the bottom walls 107 are used to help secure the optical features 120 and the louvers 150. Specifically, the bottom wall 107-1 is used (e.g., by way of one or more coupling features (e.g., clips, recesses, slots, detents, fastening devices)) to secure the bottom edge of the optical feature 120-1 and at least one surface (e.g., the vertical side surface 153-1, the bottom surface 152) of the louvers 150. Similarly, the bottom wall 107-2 is used to secure the bottom edge of the optical feature 120-2 and at least one surface (e.g., the vertical side surface 153-2, the bottom surface 152) of the louvers 150. Further, the end cap 110-1 can be used (e.g., by way of one or more coupling features (e.g., clips, recesses, slots, detents, fastening devices)) to help secure an end of the optical feature 120-1 and the optical feature 120-2. Similarly, the end cap 110-2 is used to help secure an opposite end of the optical feature 120-1 and the optical feature 120-2.

In this case, the optical feature 120-1 and the optical feature 120-2 are continuous along the entire length of the housing 105. In alternative embodiments, one or more optical features 120 can have a length and/or width that are less than the overall length and width of a wall (e.g., side wall 108-1) of the housing 105 with which such optical feature 120 is integrated. Further, the optical feature 120-1 and the optical feature 120-2 in this case have a greater thickness than the thickness of side wall 108-1 and side wall 108-2, respectively. When viewed from above, an optical feature 120 can have any of a number of shapes, including but not limited to a rectangle (as in this case), a circle, an ellipse, a triangle, a hexagon, and a random shape.

In this case, the optical feature 120-1 and the optical feature 120-2 are each planar along their length, width, and height. In alternative embodiments, an optical feature 120 can be non-planar (e.g., have a curvature, have variable thickness along its length, width, and/or height) in one or more of its dimensions. Each optical feature 120 is configured to allow light emitted by the light sources 170 to pass therethrough. An optical feature 120 can reflect (partially) light and/or refract light. An optical feature 120 can be clear, translucent, semi-transparent, and/or have some other type of light transmission characteristic. An optical feature 120 can have uniform or variable features (e.g., speckling, etching, lack of features, refractive elements, coloring) along its length, width, and/or height.

Figure 3:
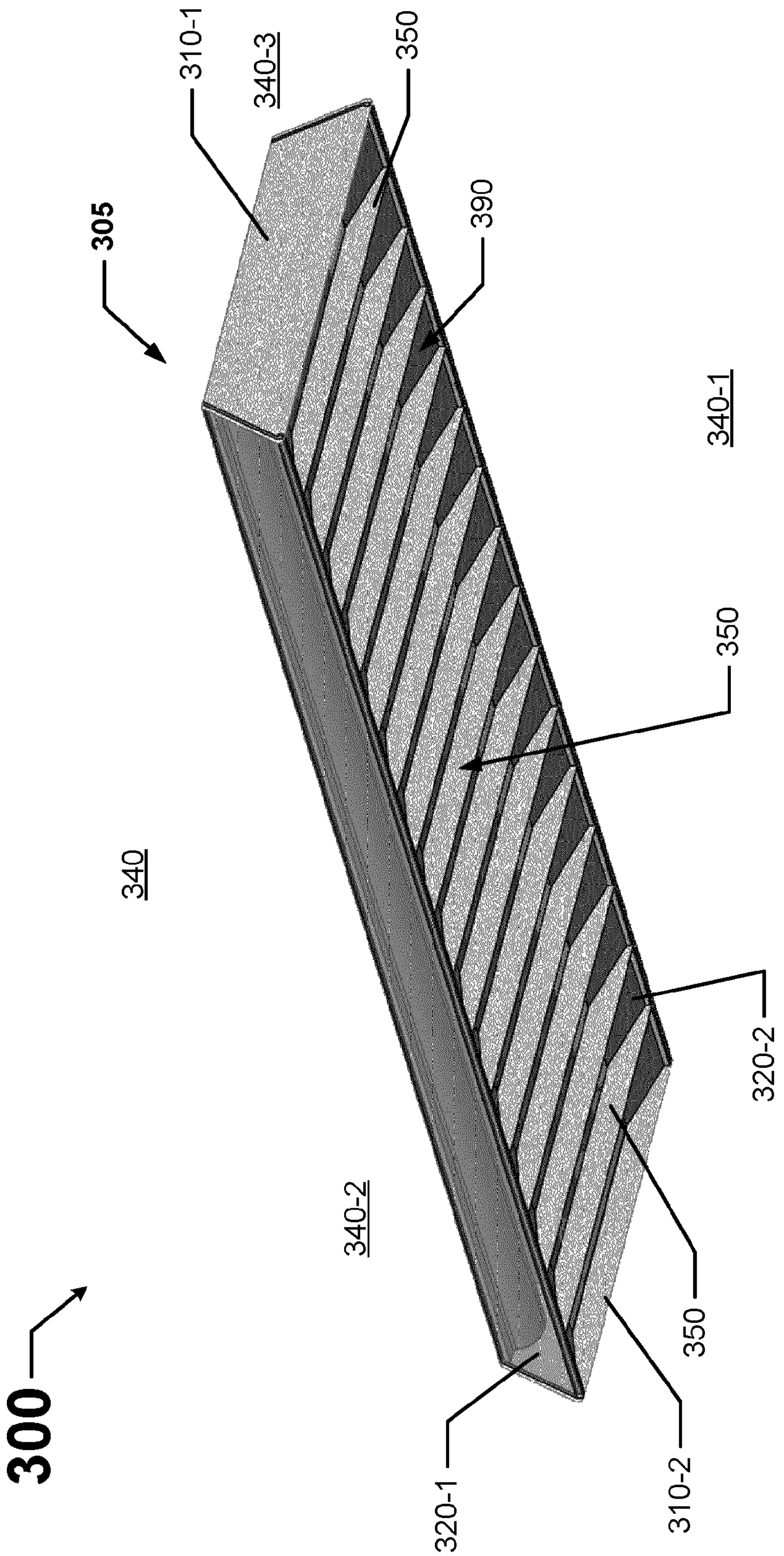
FIG. 3 shows another lighting device according to certain example embodiments.

The side walls 108, the top wall 106, the intermediate wall 109, and the end caps 110 of the housing 105 form an enclosed cavity 160 inside of which can be housed one or more components (e.g., a driver, a battery, a controller, a sensor device) of the lighting device 100. In some cases, as shown in FIG. 3 below, the cavity 160 and at least some of the walls used to form the cavity 160 can be eliminated from the housing 105. The housing 105 can also include another cavity 190 that is open-ended (at least at the bottom) and has multiple portions (e.g., cavity portion 190-1, cavity portion 190-2, cavity portion 190-3).

Disposed on the bottom surface of the intermediate wall 109 of the housing 105 (and so disposed within the cavity 190) can be one or more light sources 170. In this case, there are four separate rows of light sources 170, where each row has multiple light sources 170. In alternative embodiments, the light sources 170 can be arranged in any of a number of other configurations (e.g., concentric circles, randomly, multiple clustered groups). The light sources 170 can use any of a number of different lighting technologies, including but not limited to light-emitting diodes (LEDs), incandescent bulbs, fluorescent bulbs, and halogen bulbs. When the light sources 170 are LEDs, the light sources 170 can utilize any type of LED technology, including but not limited to chip-on-board and surface mount diode.

Optionally, the lighting device 100 can include one or more optical devices 180. In this case, there are four optical devices 180, also located within the cavity 190, one for each row of light sources 170. These optical devices 180 are disposed against or near the bottom surface of the intermediate wall 109 of the housing 105 and at least partially surround the light sources 170 so that substantially all light emitted by the light sources 170 passes through the optical devices 180. When the lighting device 100 includes one or more optical devices 180, the light emitted by the light sources 170 can be refracted and/or otherwise manipulated (e.g., change color) within the cavity 190 before exiting the cavity 190. In the absence of the optional optical devices 180, the light emitted by the light sources 170 travel within the cavity 190 without manipulation before reaching the reflectors 130 (also called reflective components 130 herein), the optical features 120, and/or the louvers 150. In this case, there are multiple louvers 150 disposed in the cavity portion 190-1 of the cavity 190, which is disposed at the bottom (open end) of the cavity 190. One louver 150 can be configured (e.g., length, height, thickness, cross-sectional shape, orientation, material, translucence, texture, color) the same as, or differently than, one or more of the other louvers 150. Also, the spacing (e.g., one inch, 2 centimeters) between adjacent louvers 150 can be uniform or variable throughout. One or more of the louvers 150 can be fixed, adjustable, and/or replaceable. In this case, all of the louvers 150 are configured identically with respect to each other, are arranged in parallel with each other, and are fixed within the cavity portion 190-1.

Each louver 150 of FIGS. 1A through 1C has a top surface 151 and a bottom surface 152 that are planar and in parallel with each other. The bottom surface 152 of each louver 150 has a greater length compared to the length of the top surface 151 of the louver 150. The top surface 151 of each louver 150 is vertically centered with respect to the bottom surface 152 of the louver 150. There is a small vertical side surface 153 that extends upward from each end of the bottom surface 152 of a louver 150, with vertical side surface 153-1 extending upward from one end of the bottom surface 152 and vertical side surface 153-2 extending upward from the other end of the bottom surface 152. There is also a diagonal side surface 154 that extends from the top of each vertical side surface 153 to an end of the top surface 151. In this case, diagonal side surface 154-1 extends from the top of the vertical side surface 153-1 to one end of the top surface 151, and diagonal side surface 154-2 extends from the top of the vertical side surface 153-2 to the other end of the top surface 151. The various surfaces (e.g., the top surface 151) of each louver 150 have small widths when the thickness of the louver 150 is small.

In certain example embodiments, the lighting device 100 includes one or more reflective components 130. Each reflective component 130 is configured to reflect at least some of the light directed at it. In this case, there are two reflective components 130, where reflective component 130-1 is positioned near optical feature 120-1 in the cavity portion 190-2 of the cavity 190, and where reflective component 130-2 is positioned near optical feature 120-2 in the cavity portion 190-3 of the cavity 190. In some cases, as in this example, an optical feature 120 can be disposed on a surface (in this case, a diagonal side surface 154) of some or all of the louvers 150. Specifically, in this case, an optical feature 120 is coincident with (abuts against) a diagonal side surface 154 of all of the louvers 150. Alternatively, an optical feature 120 can be positioned near, but without actually contacting, one or more of the louvers 150.

Each reflective component 130 can be made out of and/or coated with a reflective material that reflects light emitted by the light sources 170. This reflective characteristic can be part of an outer surface and/or an inner surface of a reflective component 130. In some cases, a reflective component 130 reflects all light directed at it. In some other cases, a reflective component 130 can additionally or alternatively be made of a material that allows some of the light directed at the reflective component 130 to be transmitted (e.g., refracted) therethrough while the remainder of the light is reflected from the reflective component 130. As yet another alternative, one or more portions of a reflective component 130 can allow light directed at it to pass (with or without any reflection) therethrough, while other portions of the reflective component 130 reflect the light directed at it.

In some cases, if an optical feature 120 is a physical component (i.e., not merely an opening in a wall of the housing 105), then the optical feature 120 and an associated reflective component 130 can be part of a single extruded piece or are separate pieces that are coupled to each other. In yet other alternative embodiments, a reflective component 130 can be part of a single extruded piece with a portion of the housing 105 or is a separate piece that is coupled to a portion of the housing 105.

Figure 2:
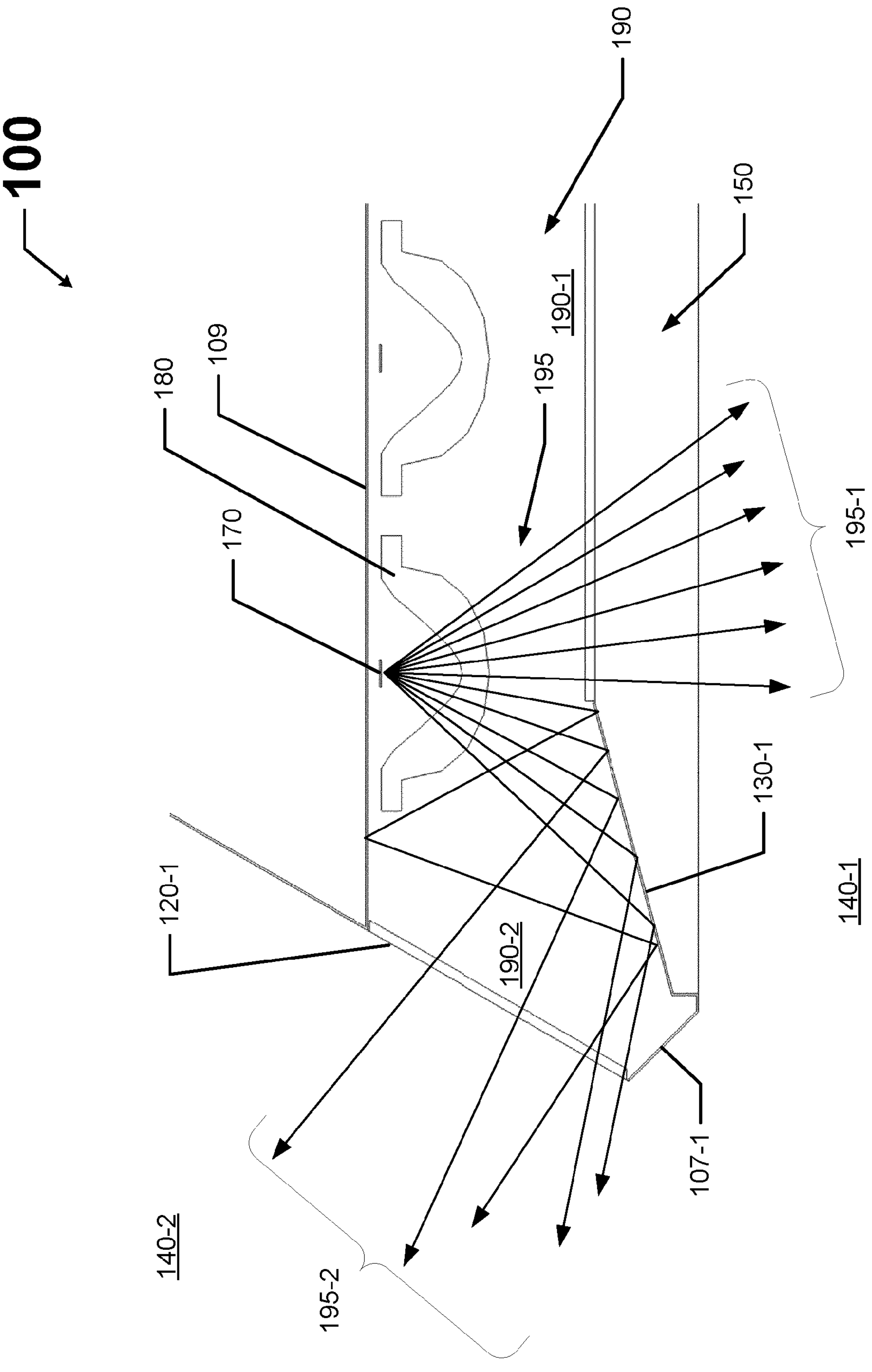
FIG. 2 shows a range of radiation paths of the light sources of the lighting device of FIGS. 1A through 1C.

Further, each reflective component 130 can have a particular orientation within the cavity 190 (or portion thereof) relative to one or more other components of the lighting device 100. A reflective component 130 can be integral with (e.g., extruded) a portion of the housing 105 (e.g., a bottom wall 107). Alternatively, a reflective component 130 can be a separate piece (e.g., an insert) disposed on and/or coupled to a portion of the housing 105. As shown in FIG. 2 below, the purpose of the orientation of each reflective component 130 is to redirect some of the light emitted by the light sources 170 toward a nearby optical feature 120 for uplighting.

For example, as shown in FIG. 1B, reflective component 130-1 forms an angle 135-1 with an extension of the top surface 151 of the louvers 150, which also equals the angle between the reflective component 130-1 and the bottom surface 152 of the louvers 150 since the top surface 151 and the bottom surface 152 of the louvers 150 are parallel to each other. Similarly, reflective component 130-2 forms an angle 135-2 with an extension of the top surface 151 of the louvers 150, which also equals the angle between the reflective component 130-2 and the bottom surface 152 of the louvers 150.

Because of the particular configuration of the louvers 150 in this case, as discussed above, angle 135-1 equals angle 135-2. In alternative embodiments, when there are two reflective components 130, angle 135-1 and angle 135-2 can differ from each other based on one or more of any number of factors, including but not limited to the configuration of the louvers 150, the relative location of the light sources 170, the existence and characteristics of the optical devices 180, and the configuration of the reflective components 130. An angle 135 can be fixed. Alternatively, an angle 135 can be adjustable, for example, based on the configuration of the coupling features used to couple the reflective component 130 and the bottom wall 107 of the housing 105 to each other.

When the lighting device 100 includes multiple reflective components 130, as in this case, one reflective component can have characteristics (e.g., material, coating, shape, size, orientation relative to the nearby optical feature 120, orientation relative to the light sources 170) that are the same as, or different than, the corresponding characteristics of one or more of the other reflective components 130. In this example, the characteristics of the reflective component 130-1 are substantially similar to the corresponding characteristics of the reflective component 130-2.

Each reflective component 130 can also have a particular orientation in its part of the cavity 190 relative to the nearby optical features 120. For example, in this case, the reflective component 130-1 forms an angle 137-1 with the optical feature 120-1, and the reflective component 130-2 forms an angle 137-2 with the optical feature 120-2. As those of ordinary skill in the art will appreciate, other angles can be established between a reflective component 130 and another component (or portion thereof) of the lighting device 100 to define the orientation of that reflective component 130 and/or another component (e.g., an optical feature 120) of the lighting device 100. In some cases, an angle 137 can be fixed. Alternatively, an angle 137 can be adjustable, for example, based on the configuration of the coupling features used to couple a reflective component 130 and the bottom wall 107 of the housing 105 to each other. In this example, the angle 137-1 and the angle 137-2 are fixed acute angles to encourage that light reflected off of the reflective components 130 are directed through the optical features 120.

As shown in FIG. 2 below, the angle 135 formed between a reflective component 130 and part of the louvers 150 and the angle 137 formed between a reflective component 130 and a nearby optical feature 120 are designed to direct some of the light emitted by the light sources 170 to be directed into an ambient environment part (e.g., ambient environment part 140-2, ambient environment part 140-3) that is elevated (for uplighting) relative to the ambient environment part 140-1 where other light emitted by the light sources 170 is directed (for downlighting).

FIG. 2 shows a range of radiation paths 195 of the light sources 170 of the lighting device 100 of FIGS. 1A through 1C. FIG. 2 shows part FIG. 1B, which is the front view of the lighting device 100 without the endcap 110-1. Referring to FIGS. 1A through 2, the range of radiation paths 195 is shown as being emitted from the row of light sources 170 closest to side wall 108-1 and optical feature 120-1. The optical devices 180, disposed near the light sources 170, do not have any refractive properties. As a result, the range radiation paths 195 that travel through the optical devices 180 are unaltered when entering the cavity 190 of the housing 105.

One portion (e.g., a first portion) of the range of radiation paths 195-1, after traveling through the optical devices 180, travel through the cavity portion 190-1, pass around the louvers 150, and are emitted into the ambient environment part 140-1 to provide downlighting. Another portion (e.g., a second portion) of the range of radiation paths 195-2, after traveling through the optical devices 180, travel through the cavity portion 190-2, reflect off of the reflective component 130-1, through the optical feature 120-1, and into the ambient environment part 140-2 to provide uplighting. With respect to the range of radiation paths 195-2, some of the radiation passes through the optical feature 120-1 directly after being reflected off of the reflective component 130-1, while some of the other radiation internally reflects off of multiple interior surfaces (e.g., the bottom surface of the intermediate wall 109, the bottom wall 107-1, the reflective component 130-1) before passing through the optical feature 120-1 and into the ambient environment part 140-2.

The range of radiation paths 195 for light emitted by the other rows of light sources 170 can similarly have different portions, where some portions of the range of radiation paths 195 pass around the louvers 150 to radiate into the ambient environment part 140-1, and where other portions of the range of radiation paths 195 are reflected at least once off of a reflective component 130 (in this case, reflective component 130-1 or reflective component 130-2) before passing through an optical feature 120 (in this case, optical feature 120-1 or optical feature 120-2) and into an ambient environment part 140 (ambient environment part 140-2 or ambient environment part 140-3) that is elevated relative to ambient environment part 140-1.

The range of radiation paths 195 generated by the light sources 170 located closer to the center (from the front view offered in FIGS. 1B and 2) of the lighting device 100 tend to travel to the ambient environment part 140-1 rather than the ambient environment part 140-2 or the ambient environment part 140-3, while relatively more of the range of radiation paths 195 generated by the light sources 170 located closer to the sides (from the front view offered in FIGS. 1B and 2) of the lighting device 100 tend to travel to the ambient environment part 140-2 or the ambient environment part 140-3 rather than the ambient environment part 140-1.

FIG. 3 shows another lighting device 300 according to certain example embodiments. Specifically, FIG. 3 shows a bottom-front-side isometric view of the lighting device 300. Referring to FIGS. 1A through 3, the lighting device 300 of FIG. 3 and its various components are substantially the same as the lighting device 100 of FIGS. 1A through 2 and its corresponding components, except as described below. Specifically, while the lighting device 300 is a linear light fixture, the housing 305 of the lighting device 300 of FIG. 3 lacks the upper parts (e.g., side walls 108, top wall 106, cavity 160) that are part of the lighting device 100 of FIGS. 1A through 2. The components (e.g., driver, battery) of the lighting device 100 that are disposed in the cavity 160 can be located remotely from the housing 305 of FIG. 3 and/or integrated with the light sources of the lighting device 300. In either case, the equivalent of the intermediate wall 109 of the lighting device 100 of FIGS. 1A through 2 becomes the top wall (hidden from view in FIG. 3) of the lighting device 300.

The optical feature 320-1 acts as one side wall of the housing 305 of the lighting device 300, and the optical feature 320-2 acts as the opposing side wall of the housing 305 of the lighting device 300. In this case, the optical features 320 are clear lenses. The lighting device 300 of FIG. 3 also lacks the bottom walls 107 of the housing 105 of the lighting device 100 of FIGS. 1A through 2. Consequently, the optical features 320 of FIG. 3 can be configured to couple directly to one or more surfaces of the louvers 350.

The lighting device 300 of FIG. 3 is in the form of another linear light fixture that includes multiple portions. For example, the lighting device 300 of FIG. 3 includes a housing 305 having a top wall (hidden from view), two end caps 310 (end cap 310-1 and end cap 310-2), and two optical features 320 (optical feature 320-1 and optical feature 320-2). The lighting device 300 is disposed in an ambient environment 340 that has multiple parts (in this case, ambient environment part 340-1, ambient environment part 340-2, and ambient environment part 340-3). The ambient environment part 340-1 is disposed adjacent to the louvers 350, the ambient environment part 340-2 is disposed adjacent to the optical feature 320-1, and the ambient environment part 340-3 is disposed adjacent to the optical feature 320-2. In this case, the ambient environment part 340-2 and the ambient environment part 340-3 are elevated relative to the ambient environment part 340-1.

The process of distributing the various portions of the range of radiation paths within the cavity 390 from light emitted by the light sources of the lighting device 300 of FIG. 3 is substantially the same as the process discussed of distributing the various portions of the range of radiation paths 195 within the cavity 190 from light emitted by the light sources 170 of the lighting device 100, as set forth above with respect to FIG. 2.

Figure 4:
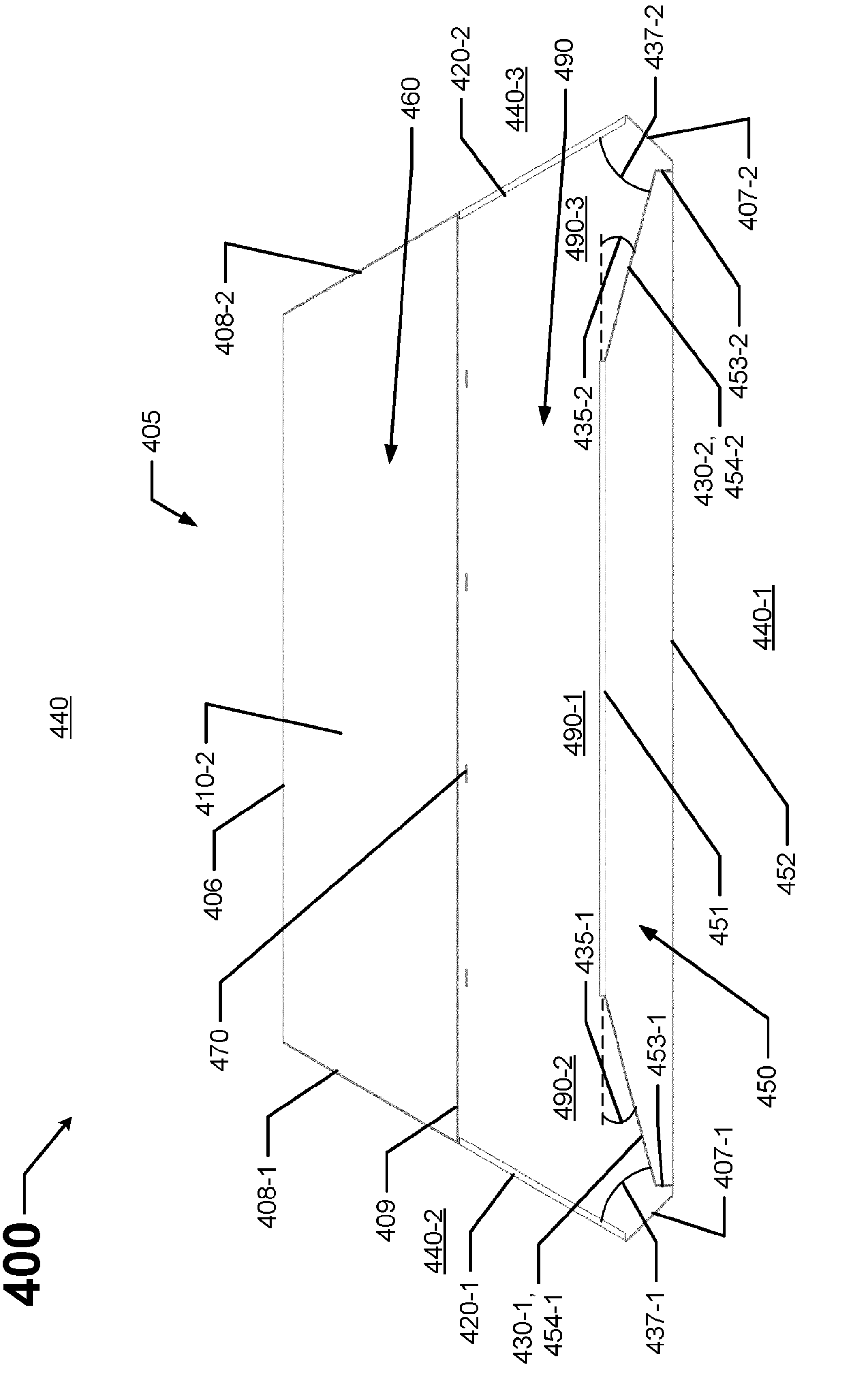
FIG. 4 shows yet another lighting device according to certain example embodiments.

FIG. 4 shows yet another lighting device 400 according to certain example embodiments. Specifically, FIG. 4 shows a front view of the lighting device 400 without the front endcap (which would be labeled as element 410-1). Referring to FIGS. 1A through 4, the lighting device 400 and its various components of FIG. 4 are substantially the same as the lighting device 100 and its corresponding components of FIGS. 1A through 2, except as discussed below. Specifically, the lighting device 400 of FIG. 4 lacks any of the optical devices 180 of the lighting device 100 of FIGS. 1A through 2.

The lighting device 400 of FIG. 4 is in the form of a linear light fixture having a housing 405 with a top wall 406, two side walls 408 (side wall 408-1 and side wall 408-2), an intermediate wall 409, two end caps 410 (with only end cap 410-2 shown in FIG. 4), and two bottom walls 407 (bottom wall 407-1 and bottom wall 407-2). The lighting device 400 is disposed in an ambient environment 440. More particularly, the ambient environment 440 has multiple parts that are adjacent to different components of the lighting device 400. In this case, ambient environment part 440-1 is disposed adjacent to the bottom surfaces 452 of the louvers 450, ambient environment part 440-2 is disposed adjacent to the optical feature 420-1, and ambient environment part 440-3 is disposed adjacent to the optical feature 420-2. In this case, the ambient environment part 440-2 and the ambient environment part 440-3 are elevated relative to the ambient environment part 440-1.

The lighting device 400 includes two optical features 420. Optical feature 420-1 is integrated with side wall 408-1 of the housing 405 at its distal half (starting at the intermediate wall 409 of the housing 405), and optical feature 420-2 is integrated with side wall 408-2 of the housing 405 at its distal half. The bottom walls 407 are used to help secure the optical features 420 and the louvers 450. Specifically, the bottom wall 407-1 is used to secure the bottom edge of the optical feature 420-1 and at least one surface (e.g., the vertical side surface 453-1, the bottom surface 452) of the louvers 450. Similarly, the bottom wall 407-2 is used to secure the bottom edge of the optical feature 420-2 and at least one surface (e.g., the vertical side surface 453-2, the bottom surface 452) of the louvers 450. Further, the end caps 410 can be used (e.g., by way of one or more coupling features (e.g., clips, recesses, slots, detents, fastening devices)) to help secure an end of the optical feature 420-1 and the optical feature 420-2.

In this case, the optical feature 420-1 and the optical feature 420-2 are continuous along the entire length of the housing 405. Further, the optical feature 420-1 and the optical feature 420-2 in this case have a greater thickness than the thickness of side wall 408-1 and side wall 408-2, respectively. In this case, the optical feature 420-1 and the optical feature 420-2 are each planar along their length, width, and height.

The side walls 408, the top wall 406, the intermediate wall 409, and the end caps 410 of the housing 405 form an enclosed cavity 460 inside of which can be housed one or more components (e.g., a driver, a battery, a controller, a sensor device) of the lighting device 400. The housing 405 also includes another cavity 490 that is open-ended (at least at the bottom) and has multiple portions (e.g., cavity portion 490-1, cavity portion 490-2, cavity portion 490-3). Disposed on the bottom surface of the intermediate wall 409 of the housing 405 (and so disposed within the cavity 490) can be one or more light sources 470. In this case, there are four separate rows of light sources 470, where each row has multiple light sources 470.

There are multiple louvers 450 disposed in the cavity portion 490-1 of the cavity 490, which is disposed at the bottom (open end) of the cavity 490. In this case, all of the louvers 450 are configured identically with respect to each other, are arranged in parallel with each other, and are fixed within the cavity portion 490-1. Each louver 450 of FIG. 4 has a top surface 451 and a bottom surface 452 that are planar and in parallel with each other. The bottom surface 452 of each louver 450 has a greater length compared to the length of the top surface 451 of the louver 450. The top surface 451 of each louver 450 is vertically centered with respect to the bottom surface 452 of the louver 450. There is a small vertical side surface 453 that extends upward from each end of the bottom surface 452 of a louver 450, with vertical side surface 453-1 extending upward from one end of the bottom surface 452 and vertical side surface 453-2 extending upward from the other end of the bottom surface 452. There is also a diagonal side surface 454 that extends from the top of each vertical side surface 453 to an end of the top surface 451. In this case, diagonal side surface 454-1 extends from the top of the vertical side surface 453-1 to one end of the top surface 451, and diagonal side surface 454-2 extends from the top of the vertical side surface 453-2 to the other end of the top surface 451.

The lighting device 400 of FIG. 4 includes two reflective components 430, where reflective component 430-1 is positioned near optical feature 420-1 in the cavity portion 490-2 of the cavity 490, and where reflective component 430-2 is positioned near optical feature 420-2 in the cavity portion 490-3 of the cavity 490. Each reflective component 430 is coincident with (abuts against) a diagonal side surface 454 of all of the louvers 450. The orientation of each reflective component 430 redirects some of the light emitted by the light sources 470 toward a nearby optical feature 420 for uplighting.

Reflective component 430-1 forms an angle 435-1 with an extension of the top surface 451 of the louvers 450, which also equals the angle between the reflective component 430-1 and the bottom surface 452 of the louvers 450 since the top surface 451 and the bottom surface 452 of the louvers 450 are parallel to each other. Similarly, reflective component 430-2 forms an angle 435-2 with an extension of the top surface 451 of the louvers 450, which also equals the angle between the reflective component 430-2 and the bottom surface 452 of the louvers 450. In this case, angle 435-1 equals angle 435-2.

In this case, the reflective component 430-1 forms an angle 437-1 with the optical feature 420-1, and the reflective component 430-2 forms an angle 437-2 with the optical feature 420-2. In this example, the angle 437-1 and the angle 437-2 are acute angles to encourage that light reflected off of the reflective components 430 is directed through the nearby optical features 420.

Figure 5:
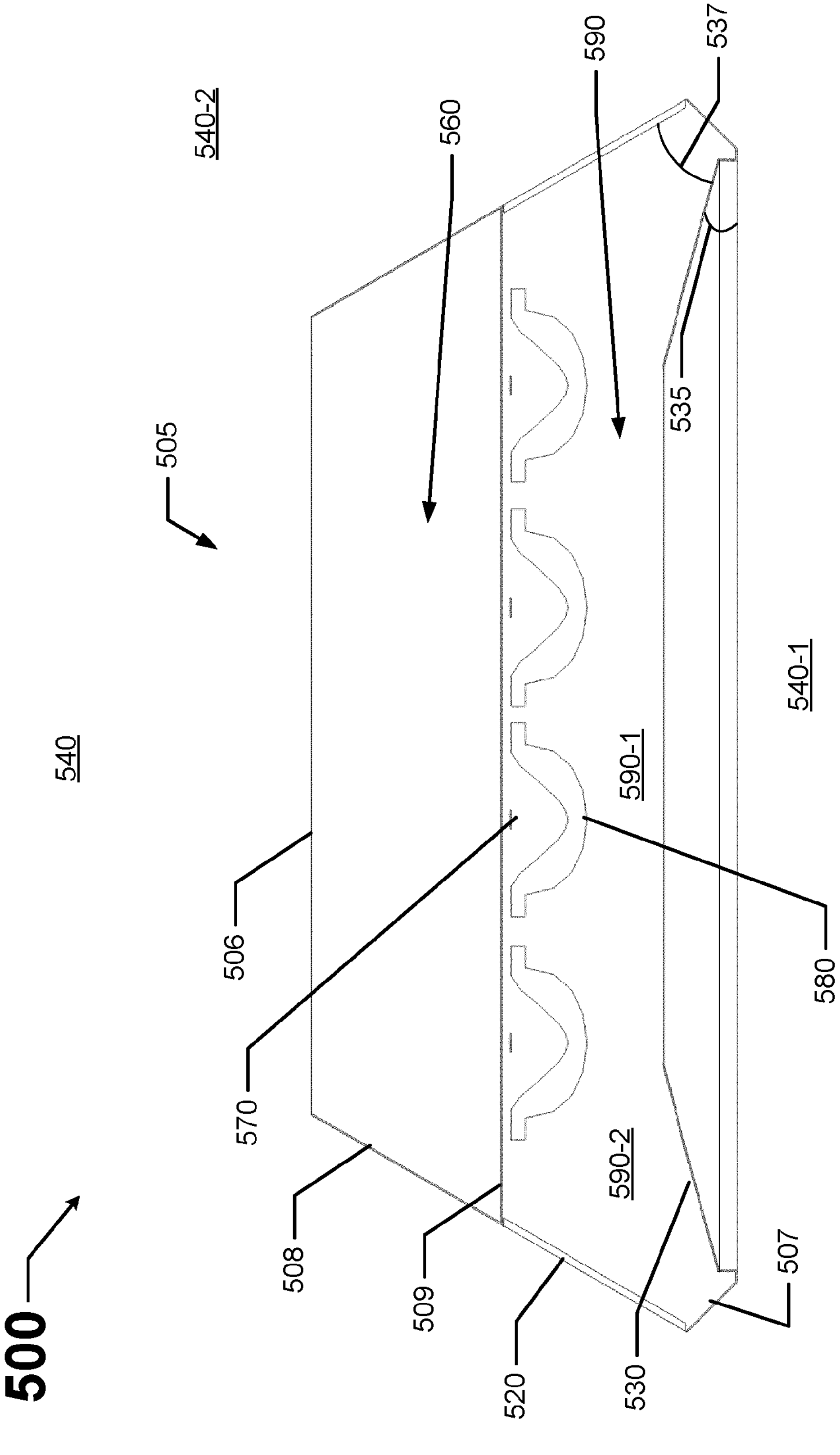
FIG. 5 shows still another lighting device according to certain example embodiments.

FIG. 5 shows still another lighting device 500 according to certain example embodiments. Specifically, FIG. 5 shows a front sectional view of the lighting device 500. Referring to FIGS. 1A through 5, the lighting device 500 and its various components of FIG. 5 are substantially the same as the lighting devices and their corresponding components of FIGS. 1A through 4, except as discussed below. For example, the lighting device 500 of FIG. 5 is a circular light fixture that has a single reflective component 530, a single optical feature 520, and no louvers. Alternatively, the lighting device 500 of FIG. 5 can be a linear light fixture that has a at least two reflective components 530, at least two optical features 520, and no louvers.

The lighting device 500 of FIG. 5 has a housing 505 with a top wall 506, a single side wall 508, an intermediate wall 509, no end caps (such as end caps 110 of the lighting device 100 of FIGS. 1A through 2), and a single bottom wall 507. The lighting device 500 is disposed in an ambient environment 540. More particularly, the ambient environment 540 has multiple parts that are adjacent to different components of the lighting device 500. In this case, ambient environment part 540-1 is disposed adjacent to the bottom of the lighting device 500 (adjacent to the open-ended bottom of the cavity portion 590-1 of the cavity 590), and ambient environment part 540-2 is disposed adjacent to the optical feature 520. In this case, the ambient environment part 540-2 is elevated relative to the ambient environment part 540-1.

The lighting device 500 includes one optical feature 520. The optical feature 520 is integrated with the side wall 508 of the housing 505 at its distal half (starting at the intermediate wall 509 of the housing 505) around the entire perimeter of the housing 505. In alternative embodiments, there can be multiple optical features 520 that are disposed at intervals (e.g., equidistantly, randomly) around the perimeter of the housing 505. The bottom wall 507 is used to help secure the bottom edge of the optical feature 520. In this case, the optical feature 520 has a greater thickness than the thickness of the side wall 508.

The side wall 508, the top wall 506, and the intermediate wall 509 of the housing 505 form an enclosed cavity 560 inside of which can be housed one or more components (e.g., a driver, a battery, a controller, a sensor device) of the lighting device 500. The housing 505 also includes another cavity 590 that is open-ended (at least at the bottom) and has multiple portions (in this case, cavity portion 590-1 and cavity portion 590-2). Disposed on the bottom surface of the intermediate wall 509 of the housing 505 (and so disposed within the cavity 590) can be one or more light sources 570. In this case, there are two concentric circles of light sources 570, where each circle has multiple light sources 570.

The lighting device 500 also includes multiple optical devices 580 located within the cavity 590, where each optical device 580 covers one of the light sources 570. These optical devices 580 are disposed against or near the bottom surface of the intermediate wall 509 of the housing 505 and at least partially surround the corresponding light source 570 so that substantially all light emitted by the light sources 570 passes through the optical devices 580.

The lighting device 500 of FIG. 5 includes a single reflective component 530 positioned in the cavity portion 590-2 of the cavity 590 near the entire perimeter of the housing 505 formed by the optical feature 520. The orientation of the reflective component 530 redirects some of the light emitted by the light sources 570 toward the nearby optical feature 520 for uplighting. The reflective component 530 forms an angle 535 with a plane formed by the bottom of the bottom wall 507 of the housing 505. The angle 535 can be the same or variable around the entire perimeter formed by the reflective component 530. Also, the reflective component 530 forms an angle 537 with the optical feature 520. In this example, the angle 537 is an acute angle to encourage that light reflected off of the reflective components 530 is directed through the nearby optical features 520.

FIGS. 6-14 show various adjustable beam optics, wherein two or more optics/lens are coupled together to form a final optic/lens that provide a predetermined light distribution. As further described below and shown in FIGS. 6-14 respective optics/lens portions 602, 604 have one or more characteristics including different curvatures, curvature radius, optical axis, grooves, and thickness.

Figure 6:
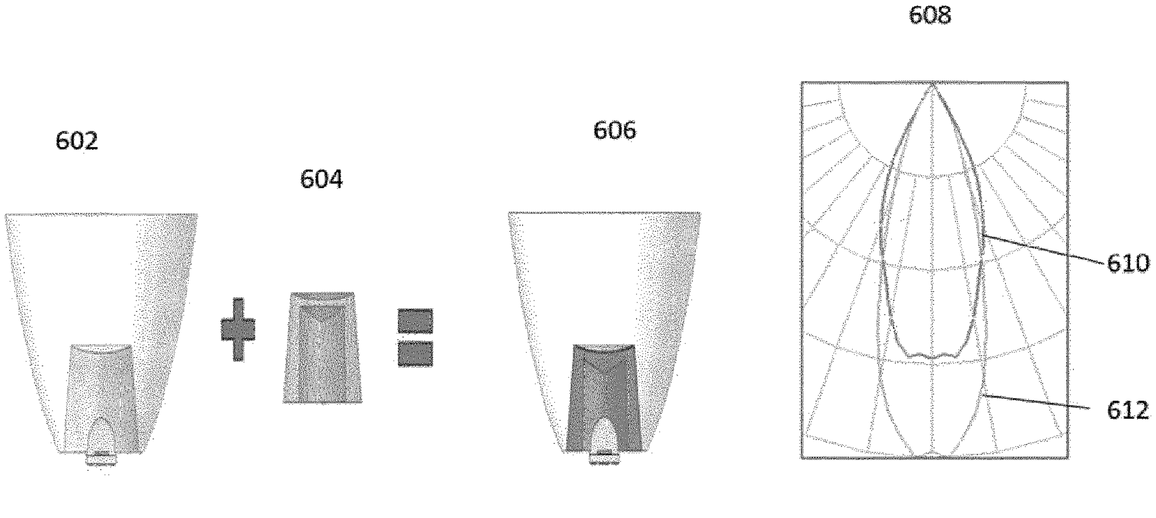
FIGS. 6-14 show beam adjustable optics according to certain example embodiments.

FIG. 6 shows an adjustable beam TIR optic for beam narrowing. The TIR optic/lens 602 is provided with an insert 604 to produce a TIR optic/lens 606. As shown the insert 604 is placed in to a cavity of the optic 602 and can fastened via a mechanical or other known means. The insert 604 can be completely or partially enclosed by optic 602. The light beam distribution for original optic 602 is shown in graph 608 by element 610. The light beam distribution for original optic 606 is shown in graph 608 by element 612.

Figure 7:
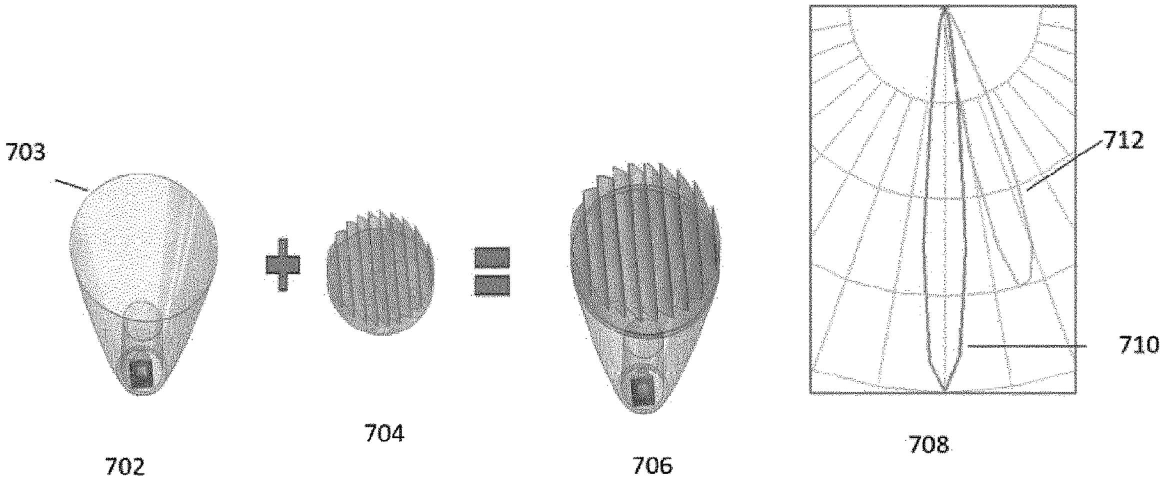

FIG. 7 shows an adjustable beam TIR optic with adjustment on the top face that skew the bam to the side. The original optic/lens 702 with a top (703) is provided with a top lens 704 to produce a TIR optic/lens 706. As shown the top lens 704 is placed on top of the optic 702 and can fastened via a mechanical or other known means. The light beam distribution for original optic 702 is shown in graph 708 by element 710. The light beam distribution for original optic 706 is shown in graph 708 by element 712.

Figure 8:
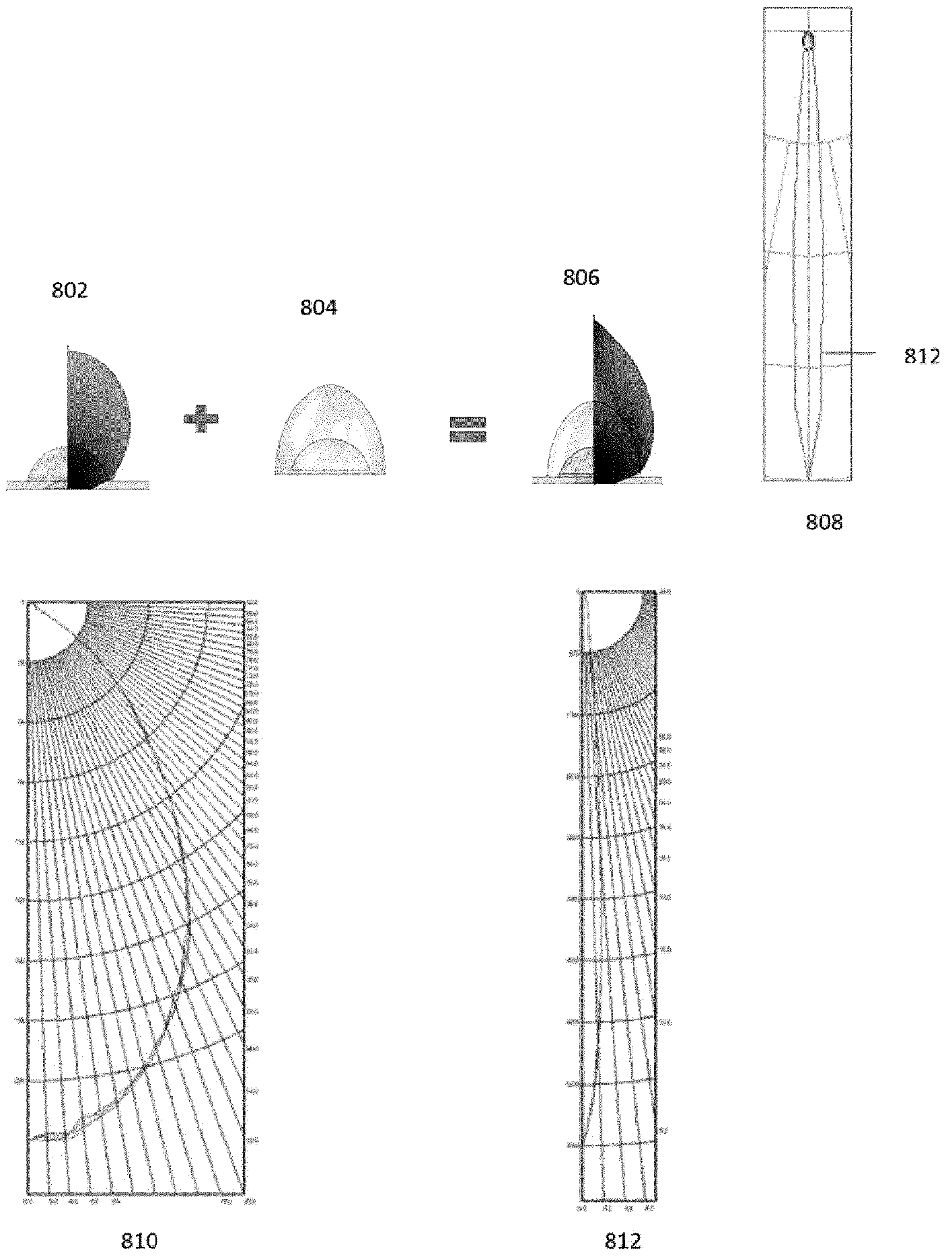

FIG. 8 shows an adjustable beam Blob optic for beam narrowing. The original optic/lens 802 is provided with a top lens 804 to produce a blob optic/lens 806. As shown the top lens 804 is placed on top of the optic 802 and covers the entire optic 802. It can be fastened via a mechanical or other known means. The light beam distribution for original optic 802 is shown in graph 808 by element 810. The light beam distribution for original optic 806 is shown in graph 808 by element 812.

Figure 9:
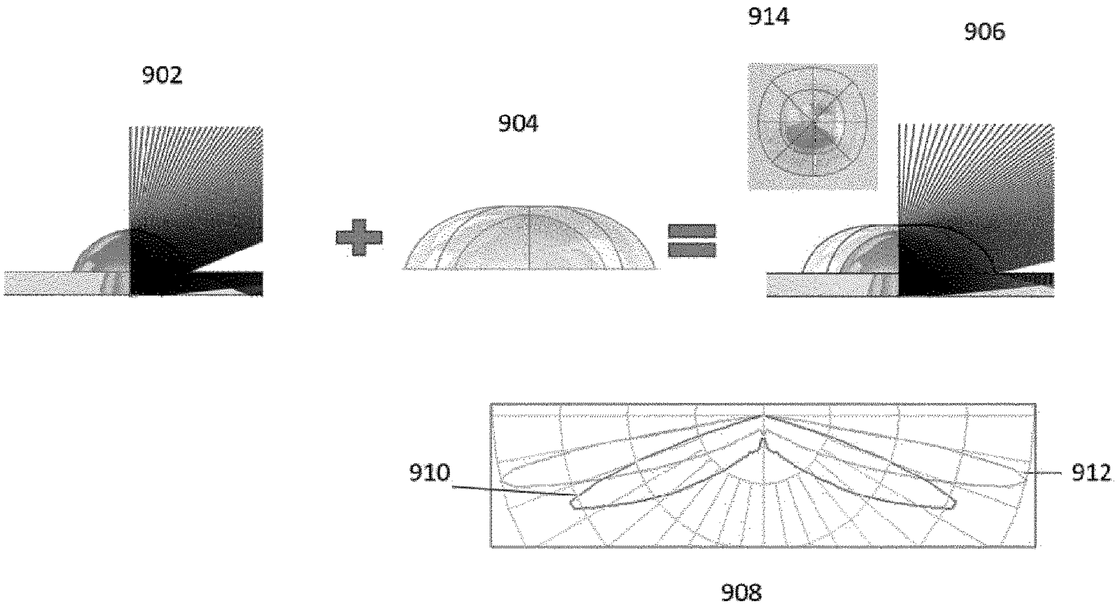

FIG. 9 shows an adjustable beam Blob optic for beam widening. The original optic/lens 902 is provided with a top lens 904 to produce a blob optic/lens 906. As shown the top lens 904 is placed on top of the optic 902 and covers the entire optic 902. It can be fastened via a mechanical or other known means. The light beam distribution for original optic 902 is shown in graph 908 by element 910. The light beam distribution for original optic 906 is shown in graph 908 by element 912. Element 914 shows a top view of optic 906.

Figure 10:
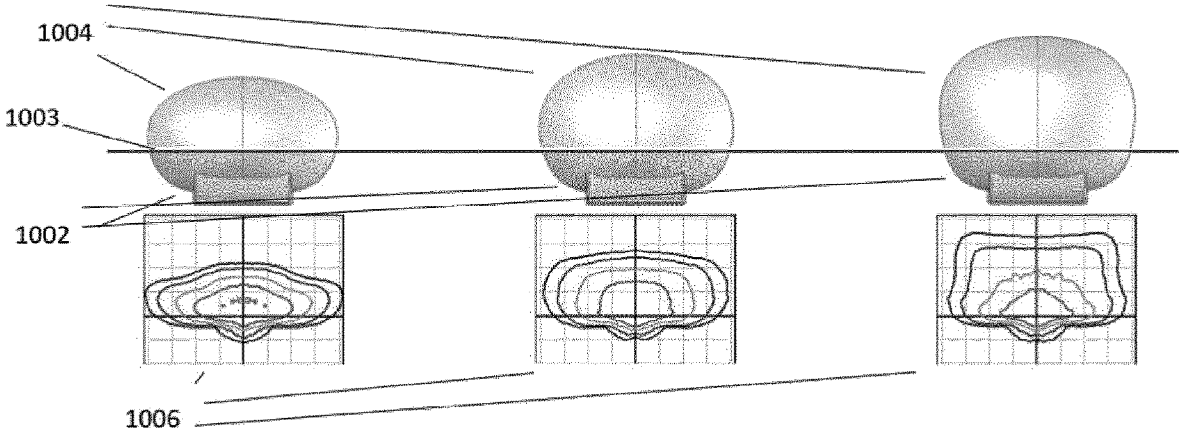

FIG. 10 shows adjustable beam Blob optics. The base optic/lens portion 1002 is provided with a top lens portion 1004 to produce a blob optic/lens 1006. As shown the top lens 1004 is placed on top of the optic 1002 and can fastened via a mechanical or other known means. The top lens 1004 can be varied in size and shape and the base optic 1002 can be the same for all three versions shown. The light beam distribution for the three blob optic 1006 is shown in graph 1006. In this manner, for example, different street-side optic components are mated to a single common house-side optic shape.

Figure 11:
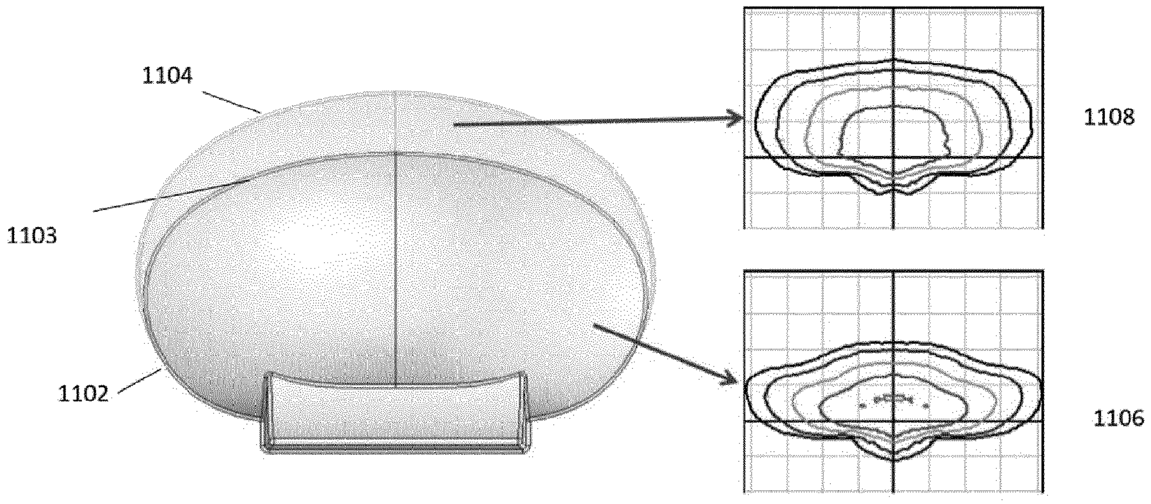

FIG. 11 shows an adjustable beam Blob optic. The original optic/lens 1102 is provided with a top lens 1104. As shown the top lens 1104 is placed on top of the optic 1102 and covers the a portion of optic 1102. It can be fastened via a mechanical or other known means. The light beam distribution for original optic 1102 is shown in graph 1106. The light beam distribution for combined optic is shown in graph 1108.

Figure 12:
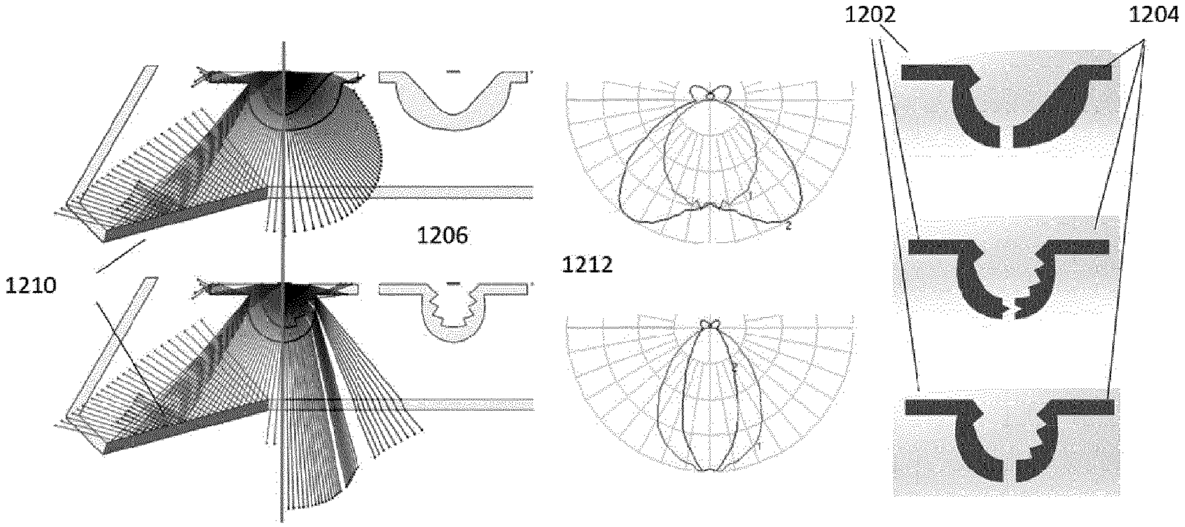

FIG. 12 shows adjustable beam optics with an up-light kicker 1210. The first side lens portion 1202 is mated with a second side lens portion 1204 to produce a final lens 1206. The first side lens portion 1202 with up-light kicker 1210 provides the up-light. The first and second side lens portions are fastened via a mechanical or other known means. As shown, the first and second side lens portions can have different curvatures and curvature radius, optical axis, grooves, thickness. The light beam distribution for the combination optics and up-light kicker are shown in graph 1212, with "1" showing the up-light portion and "2" showing downlight position.

Figure 13:
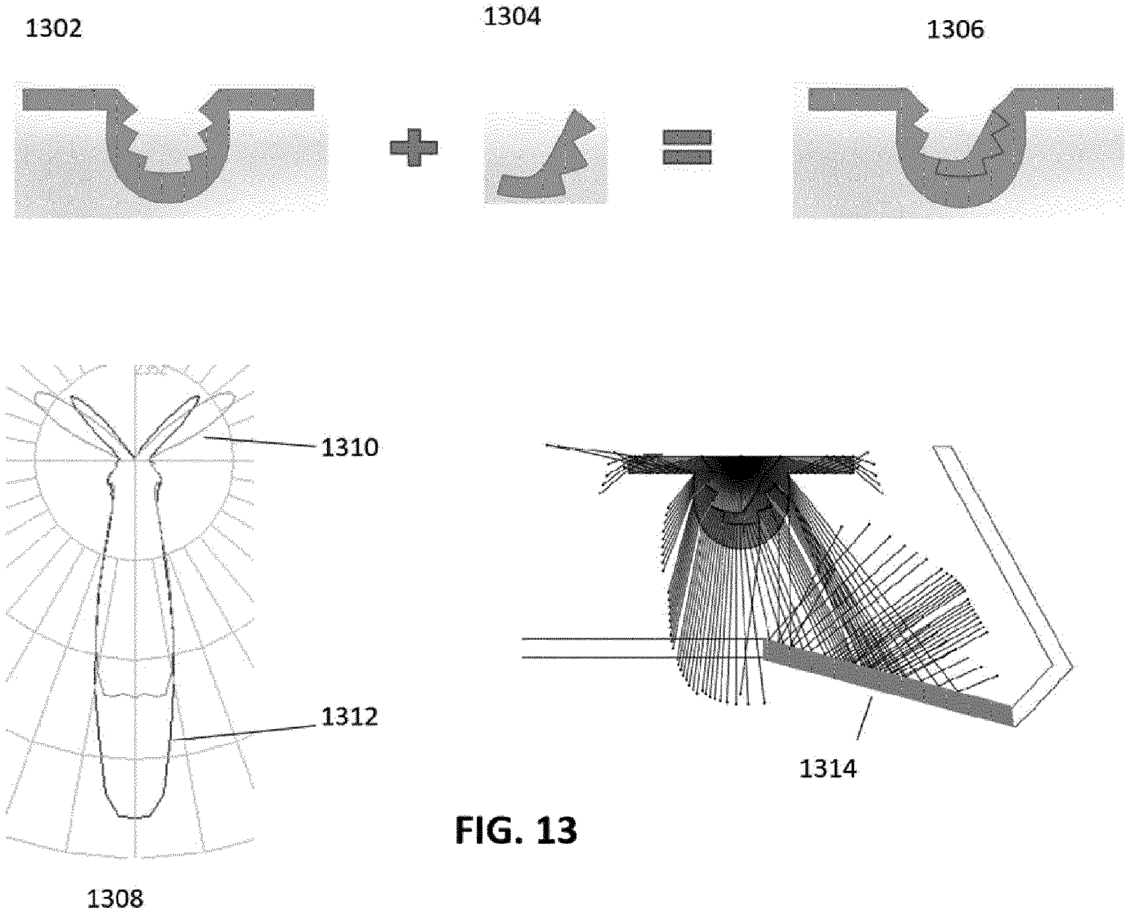

FIG. 13 shows an adjustable beam an extruded optic with an up-light kicker 1314. The optic/lens 1302 is provided with an insert 1304 to produce an optic/lens 1306. As shown the insert 1304 is placed in to a cavity of the optic 1302 and fits into a corresponding portion of the optic 1302. It can be fastened via a mechanical or other known means. The insert 1304 can be completely or partially enclosed by optic 1302. The light beam distribution for optic 1302 is shown in graph 1308 by element 1310. The light beam distribution for original optic 1306 is shown in graph 1308 by element 1312.

Figure 14:
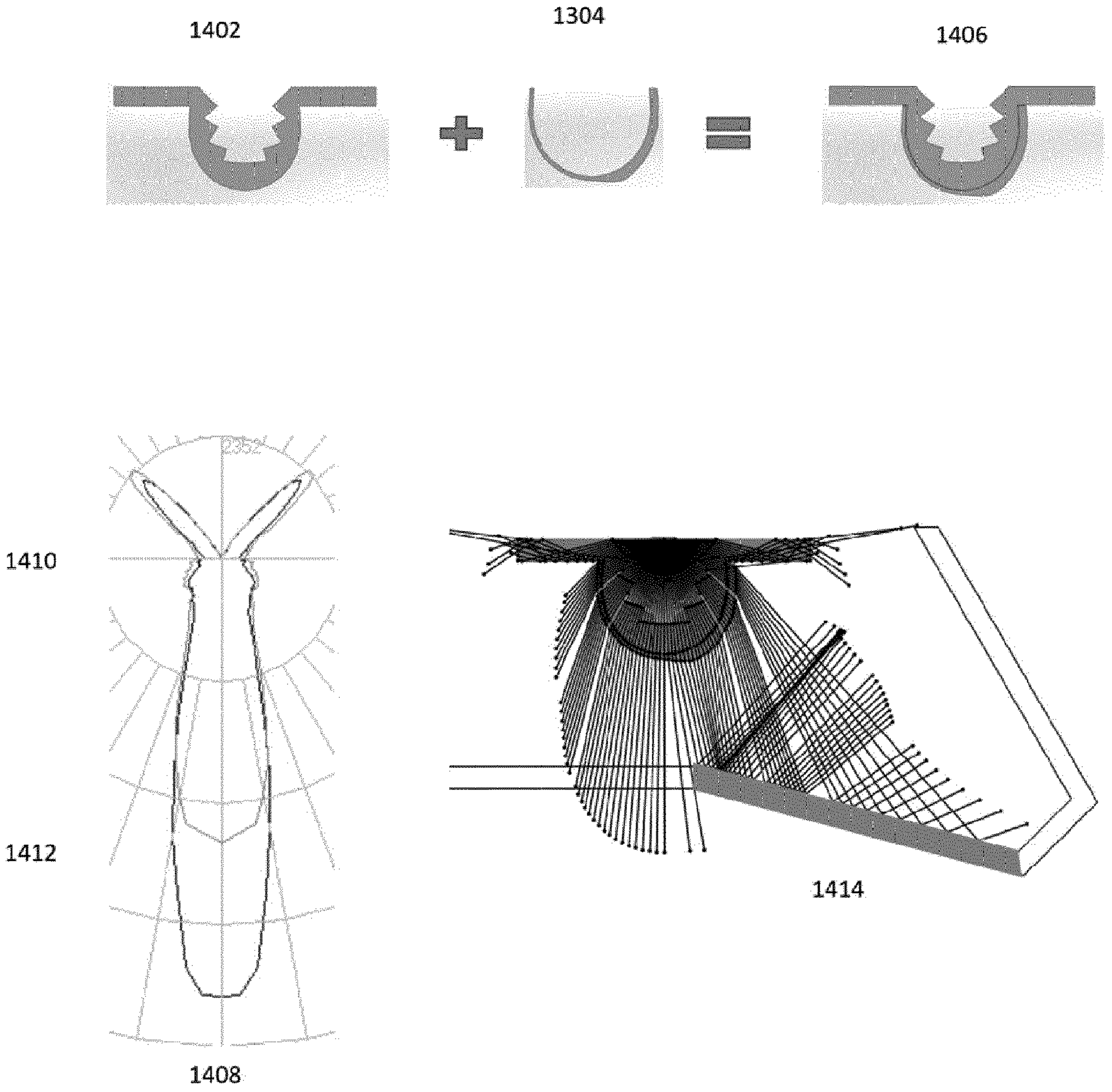

FIG. 14 shows an adjustable beam an extruded optic with an up-light kicker 1414. The optic/lens 1302 is provided with an insert 1404 to produce an optic/lens 1406. As shown the insert 1404 is placed in to a cavity of the optic 1402 and fits into a corresponding portion of the optic 1402. It can be fastened via a mechanical or other known means. The insert 1404 can be completely or partially enclosed by optic 1402. The light beam distribution for optic 1402 is shown in graph 1308 by element 1310. The light beam distribution for original optic 1406 is shown in graph 1408 by element 1412.

All of the above described optics/lens or lens portions can be, depending on the application: biconvex, plano-convex, positive meniscus, negative meniscus, Plano-concave, biconcave, aspheric, compound, Fresnel, lenticular, bifocal, gradient index, axicon, etc. or exhibit portions thereof, etc. In some cases, example embodiments can be directed to a lighting device that can include a housing comprising a plurality of walls that form a cavity, wherein the plurality of walls comprises an optical feature. Such a lighting device can also include a plurality of light sources that emit light along a range of radiation paths into the cavity, wherein the range of radiation paths comprises a first portion and a second portion. Such a lighting device can further include a plurality of louvers disposed at a first location within the cavity, wherein the first location is in the first portion of the range of radiation paths, wherein the light in the first portion of the range of radiation paths passes around the plurality of louvers into a first part of an ambient environment. Such a lighting device can also include a reflective component disposed at a second location within the cavity, wherein the second location is in a second portion of the range of radiation paths, wherein the light in the second portion of the range of radiation paths reflects off of the reflective component. With such a lighting device, the light in the second portion of the range of radiation paths, after reflecting off of the reflective component, passes through the optical feature into a second part of the ambient environment. Also, with such a lighting device, the second part of the ambient environment is elevated relative to the first part of the ambient environment.

In some cases, example embodiments can be directed to an uplight assembly for a lighting device. Such an uplight assembly can include an optical feature integrated with a housing of the lighting device. Such an uplight assembly can also include a reflective component disposed at a location within a cavity formed by the housing of the lighting device, wherein the location is near a side interior surface of the housing. With such an uplight assembly, the reflective component is positioned at an acute angle relative to the optical feature, and the reflective component is configured to be disposed adjacent to an opening at a second location in the cavity of the housing, wherein a portion of light emitted by light sources of the lighting device pass through the opening into a first part of an ambient environment. Also, with such an uplight assembly, the reflective component is configured to reflect at least some of a remainder of the light emitted by light sources of the lighting device, and the optical feature is configured to allow the at least some of the remainder of the light to pass therethrough into a second part of an ambient environment, and wherein the second part of an ambient environment is elevated relative to the first part of the ambient environment. In some cases, with this lighting assembly, the lighting device is a linear light fixture. On other cases, with this lighting assembly, the lighting device is a circular light fixture.

Example embodiments can be used to provide uplighting for various types of lighting devices, such as linear light fixtures and light fixtures with louvers. Example embodiments use a combination of reflective components and optical features to provide the uplighting. Example embodiments can be used in new installations of lighting devices as well as retrofitting existing lighting devices. Example embodiments also provide a number of other benefits. Such other benefits can include, but are not limited to, improved light distribution, ease of maintenance, smaller footprint of the lighting device, and compliance with industry standards and regulations that apply to lighting devices.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

The invention claimed is:

1. A lighting device comprising:

a housing comprising a plurality of walls that form a cavity, wherein the plurality of walls comprises an optical feature;

a plurality of light sources that emit light along a range of radiation paths into the cavity, wherein the range of radiation paths of the light comprises a first portion and a second portion;

at least one adjustable optical device that at least partially encloses at least one of the plurality of light sources within the cavity proximate to an intermediate wall of the housing, wherein the at least one adjustable optical device includes two or more connectable separate lens portions that are coupled together to form the adjustable optical device that provides a predetermined light distribution;

a reflective component disposed at a first location in the cavity within the first portion of the range of radiation paths of the light, wherein the light in the first portion of the range of radiation paths reflects off of the reflective component in a direction toward the optical feature and subsequently passes through the optical feature into a first part of an ambient environment, wherein the direction of said reflection forms an obtuse angle relative to the intermediate wall of the housing;

wherein the light in the second portion of the range of radiation paths passes through an opening at a second location in the cavity into a second part of the ambient environment, and wherein the first part of the ambient environment is elevated relative to the second part of the ambient environment; and an additional reflective component disposed at a third location in the cavity, wherein the light in a third portion of the range of radiation paths reflects off of the additional reflective component.

2. The lighting device of claim 1, wherein the housing further comprises an additional optical feature adjacent to the additional reflective component wherein the light in the third portion of the range of radiation paths, after reflecting off of the additional reflective component, passes through the additional optical feature into a third part of the ambient environment, wherein the third part of the ambient environment is elevated relative to the second part of the ambient environment.

3. The lighting device of claim 1, further comprising:

a plurality of louvers disposed in the opening at a second location in the cavity, wherein the light in the second portion of the range of radiation paths passes around the plurality of louvers into the second part of the ambient environment.

4. The lighting device of claim 3, wherein the reflective component is disposed at a first angle relative to a top surface of at least one of the plurality of louvers.

5. The lighting device of claim 4, further comprising:

an additional reflective component disposed at a third location within the cavity, wherein the additional reflective component is in a third portion of the range of radiation paths, wherein the light in the third portion of the range of radiation paths reflects off of the additional reflective component.

6. The lighting device of claim 5, wherein the housing further comprises an additional optical feature, wherein the light in the third portion of the range of radiation paths, after reflecting off of the additional reflective component, passes through the additional optical feature into a third part of the ambient environment, wherein the third part of the ambient environment is elevated relative to the second part of the ambient environment.

7. The lighting device of claim 6, wherein the optical feature and the additional optical feature have substantially similar characteristics relative to each other.

8. The lighting device of claim 3, wherein the housing further comprises a first end cap that secures the reflective component and the plurality of louvers.

9. The lighting device of claim 1, wherein the first part of the ambient environment is elevated relative to the housing.

10. The lighting device of claim 1, wherein the optical feature is a clear lens disposed in a housing wall.

11. The lighting device of claim 1, wherein the optical feature is an opening in a housing wall of the housing.

12. The lighting device of claim 1, wherein the one adjustable optical device includes one or more of: a first lens portion with a top and a second lens portion coupled to the top of the first lens portion, a first lens portion and a second lens portion covering over of the first lens portion, a first side lens portion is mated with a second side lens portion.

13. The lighting device of claim 1, wherein respective ones of the two or more lens portions have one or more characteristics including different curvatures, curvature radius, optical axis, grooves, and thickness.

14. The lighting device of claim 1, wherein adjustable optical device or lens portions are one or more of the following lens types: biconvex, plano-convex, positive meniscus, negative meniscus, Plano-concave, biconcave, aspheric, compound, Fresnel, lenticular, bifocal, gradient index, axicon.

15. The lighting device of claim 1, wherein the one adjustable optical device includes one or more of: a first lens portion having a cavity wherein a second optics/lens portion is inserted into.

* * * * *